Inventor
O. L. Gilliland
By his Attorneys

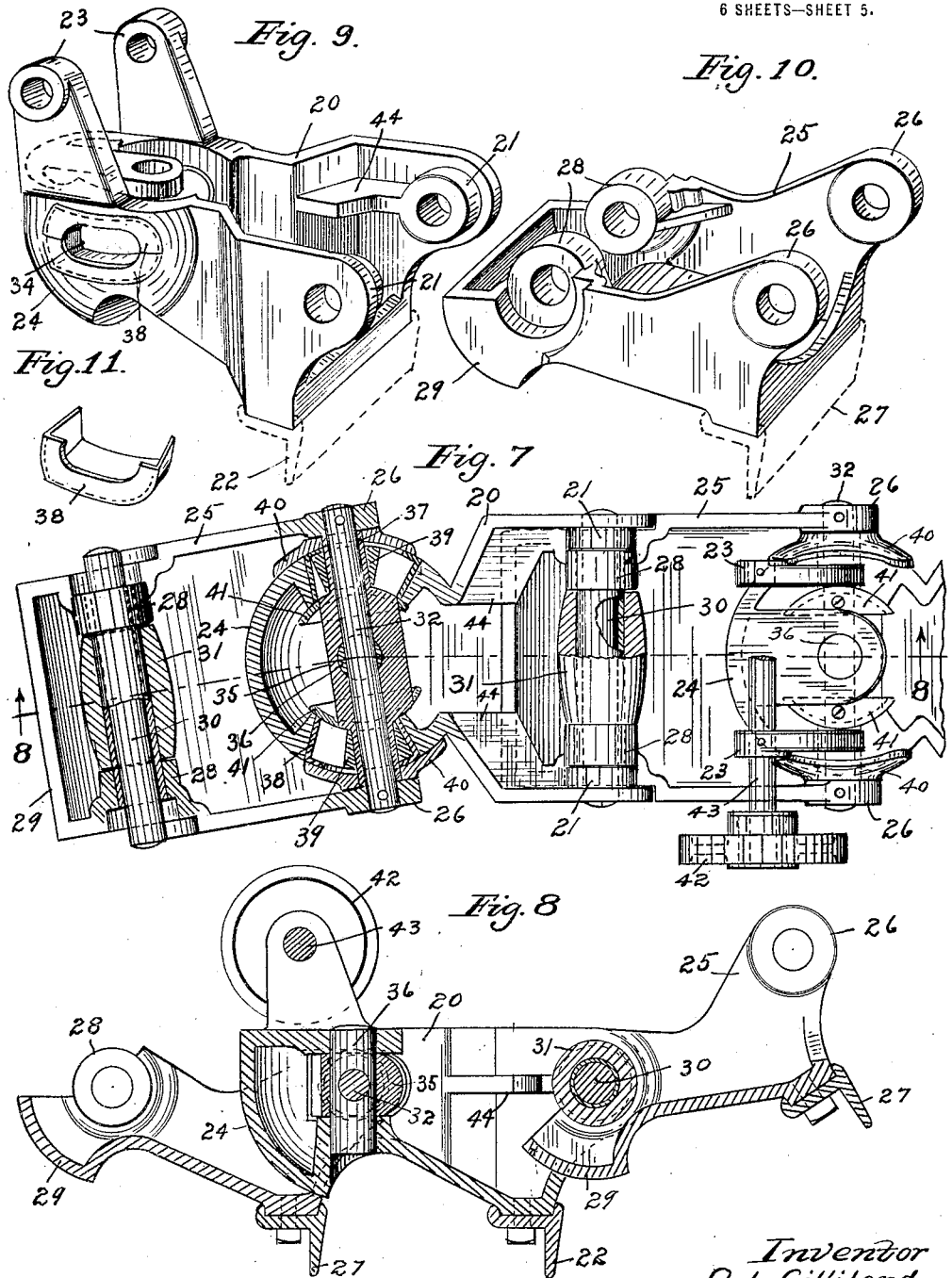

O. L. GILLILAND.
TRACTOR.
APPLICATION FILED JUNE 25, 1920.
1,436,651.
Patented Nov. 28, 1922.
6 SHEETS—SHEET 6.
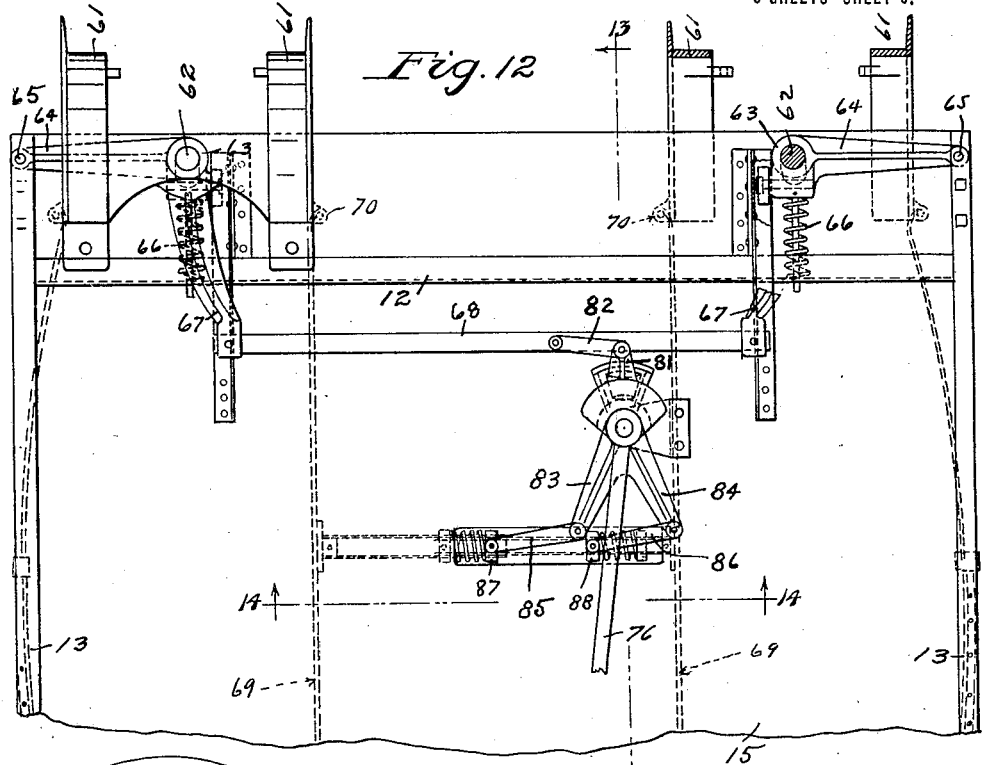
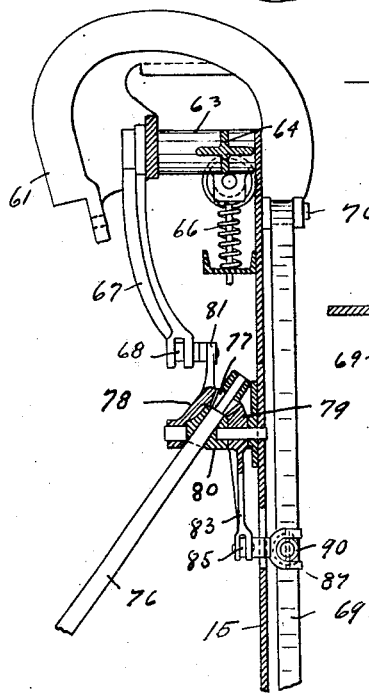
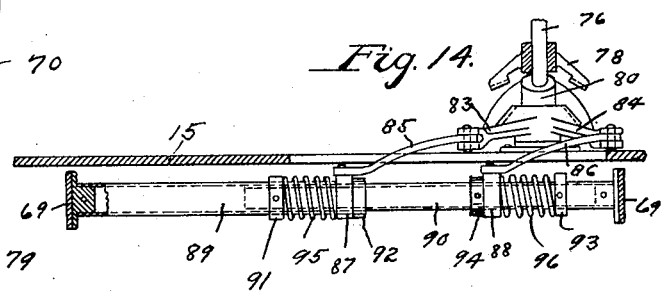
Inventor
O. L. Gilliland
By his Attorneys Patented Nov. 28, 1922.

1,436,651

UNITED STATES PATENT OFFICE.

ORRA L. GILLILAND, OF MINNEAPOLIS, MINNESOTA.

TRACTOR.

Application filed June 25, 1920. Serial No. 391,724.

*To all whom it may concern:*

Be it known that I, ORRA L. GILLILAND, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

My invention relates to tractors of the traction belt or chain type and has for its object to improve the same in the several particulars hereinafter noted. Generally stated, the invention consists of the novel devices and combinations of devices hereinafter described and defined in the claims.

The salient feature of this invention is directed to an improved form of tread chain, the arrangement being such that the tread chain may be bent laterally and laid to form a curved automatically laid track over which the tractor will run. In carrying out this invention, the links of the tread chains are equipped with wheels or rollers and the frame of the tractor is provided with a roller runway, the lower portion of which runs as a shoe over the rollers of the lower chain links. Also, the lower portion of the roller runway is provided with side flanges that are arranged to be bent to cause the tractor to follow the curvature of the tread chain when the latter is laid on the line of a curve. Of course, in running straight ahead, the tread chains will be laid straight upon the ground and the side flanges of the shoe or lower part of the roller runway will then be straight.

For propelling the tractor, a suitable engine is mounted on the frame thereof.

The chains above noted are in laterally spaced pairs and the tractor is driven forward by large sprocket-like wheels that engage the tread chain at the rear portion thereof and run forward on the lower ground-engaged links to push the tractor forward. The upper and lower portions or runs of the roller runways are connected by curved front and rear sections, the former of which are caused to push their way forward against the rollers of the downwardly moving forward links of the chains.

With the above general statements in mind, the construction of the tractor, as preferably designed, will be readily understood, and described as follows:

In the drawings, like characters indicate like parts throughout the several views.

Referring to the drawings:

Fig. 7 is a view partly in plan and partly in horizontal section showing several of the lower links of one of the tread chains;

Fig. 8 is a vertical section taken on the line 8—8 of Fig. 7, some parts being removed;

Figs. 9 and 10 are perspective views showing two adjacent links of the tread chain;

Fig. 11 is a perspective view showing one section of an elongated bushing used in the swiveled connections of the tread chains;

Fig. 12 is a view partly in plan and partly in horizontal section with some parts removed, particularly illustrating the steering connections;

Fig. 13 is a vertical section taken approximately on the line 13—13 of Fig. 12, some parts being removed; and Fig. 14 is a transverse vertical section taken approximately on the line 14—14 of Fig. 12.

Figure 1:
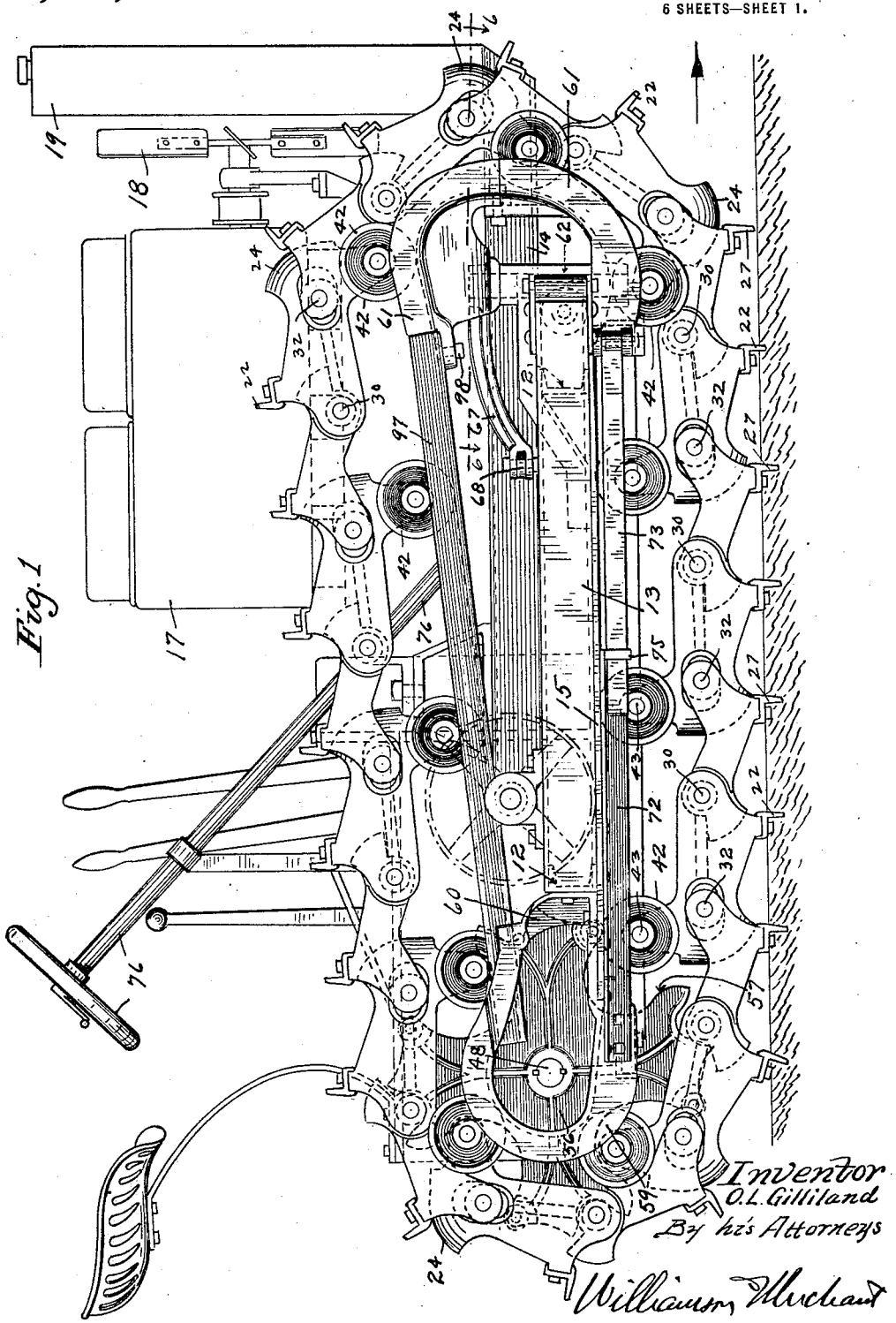
Fig. 1 is a side elevation showing the complete tractor.

The framework, as shown, is made up chiefly of transverse channel beams 12, outside and longitudinal beams 13, an intermediate yoke-shaped channel frame 14 and a platform 15, all of which parts are preferably of metal and rigidly connected together.

A multi-cylinder internal combustion engine, indicated as an entirety, by the numeral 17, is mounted directly on the frame 14, and hence, rigidly connected to the tractor frame with a crank shaft of the engine extended longitudinally of the frame. This engine has the customary fan 18 and radiator 19, the latter of which is shown as secured on the front end of the frame 14.

The two tread chains used in this tractor are, as already indicated, of novel construction, and each such tread chain, as preferably designed, comprises two types of links, such as shown in Figs. 9 and 10. These two types of links are alternated and coupled to form endless tread chains. The links 20, shown in detail in Fig. 9, are cast hollow, and are provided at one end with laterally spaced perforated ears 21 and outstanding traction cleats 22, and at their other ends are provided with laterally spaced ears 23 and with approximately spherical hollow heads 24. The links 25 shown in Fig. 10 are provided at one end with laterally spaced perforated ears 26 and traction cleats or lugs 27, and at their other ends, are provided with laterally spaced perforated ears or lugs 28 and with segmental heads 29.

When the two types of links 20 and 25 are put together, the ears 28 of the links 25 are between the ears 21 of the links 20 and the links are then coupled together by coupling pins 30, and sprocket-engaging rollers 31 are mounted on the said pins between said ears 28; and the spherical heads 24 of the links 20 are between the ears 26 of the links 25 and coupling pins 32 are passed through said ears 26 and through elongated slots 34 formed in the sides of the spherical heads 24. Pivotally mounted on the central portion of each pin 32 and located, one within each spherical head 24 is a knuckle block 35 that is coupled centrally to the front end of the co-operating link 20 by a short vertical pivot pin 36. These pins 36 afford the pivots on which the links move when they are laid to form a curved track. The knuckle blocks 35 are provided with sleeve extensions 37 that extend through the slots 34. Here it should be noted that the slots 34 are of inwardly tapered form and are preferably lined with two-part bushings 38 that are flanged at their outer extremities. Working in the bushings 38 and loosely journaled on the sleeve extensions 37 are conical rollers 39. Concave dust caps 40 are placed on the outer ends of the sleeves 37 between the ears 26 and the heads 24 and serve to keep the segmental slots 34 always closed.

Also, inner dust caps 41 secured to the blocks 35 keep the inner extremities of the slots 34 always closed.

The ears 23 of the links 20 support bearing rollers or wheels 42 that are journaled on axle pins 43 carried by said lugs 23. These rollers 43, as will be presently noted, run in the above noted runways carried by the tractor frame. The segmental heads 29 of the links 25 are adapted, under conditions hereinafter noted, to engage against stop flanges 44 on the interiors of the links 20. (See Figs. 1 and 8.)

The numeral 45 indicates a rear axle casing that is cast integral with a rear axle gear box 46 forming a part of a transmission housing 47, all thereof being rigidly secured to the rear portion of the framework of the tractor. Journaled in the rear axle casing 45 is a divided rear axle 48, the sections of which will be connected through the customary differential gear mechanism located in the gear housing 46. Of the parts of this differential gear mechanism, the numeral 49 indicates one of the two opposing beveled gears connected, one to each of the sections of the divided rear axle 48; the numeral 50 indicates one of the intermediate beveled pinions, and the numeral 51 indicates the master driving member of the differential gear, the same being in the form of a worm gear and being indicated by dotted lines only in Fig. 2. This worm gear 51 is driven by a worm 52 carried by a sleeve 53 that is normally loose on an extension 54 of the engine crank shaft but is adapted to be connected directly to said shaft extension by a sliding clutch 55.

Figure 2:
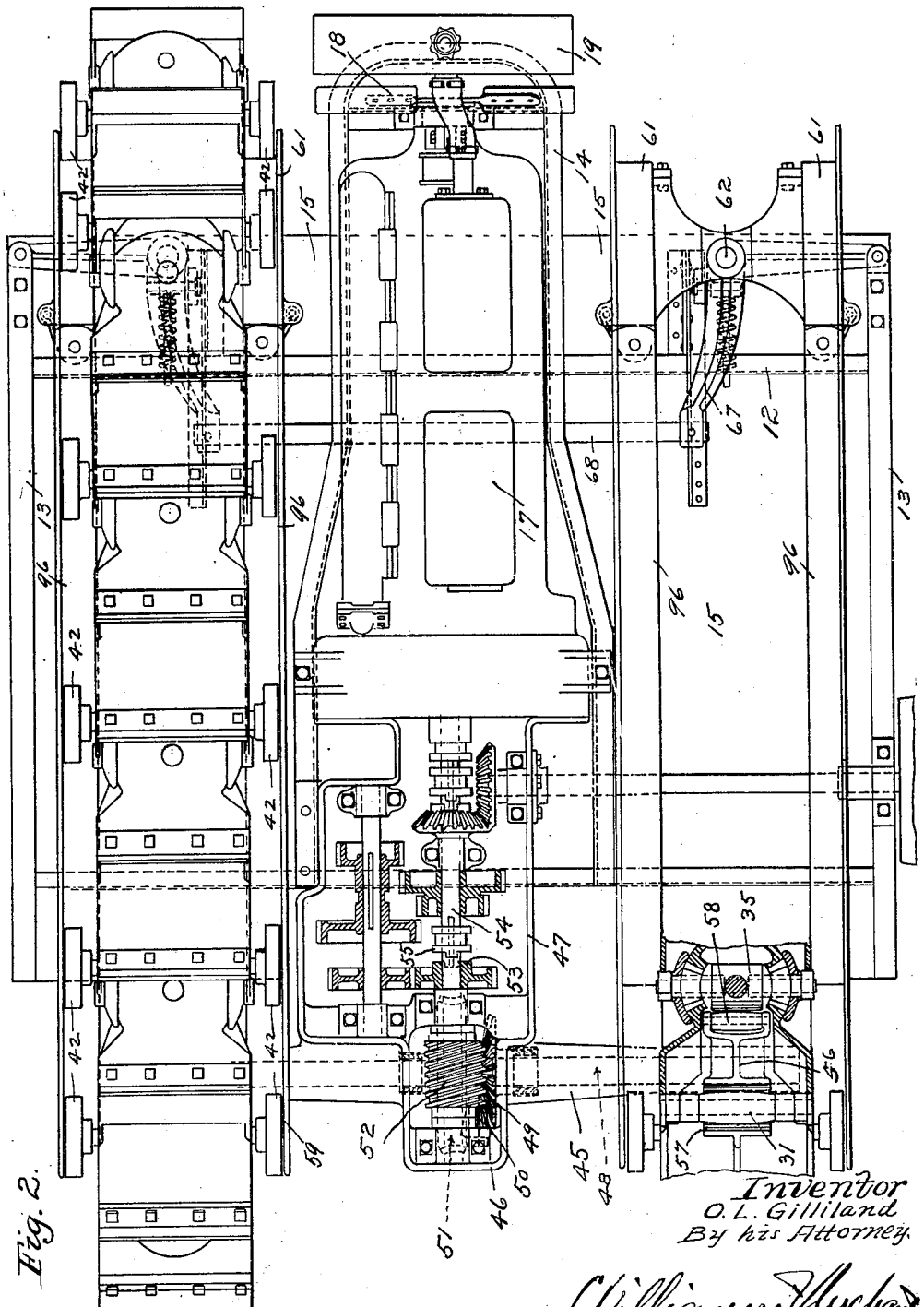
Fig. 2 is a plan view of the tractor with some parts of the transmission mechanism and some parts of one of the tread chains sectioned, other parts of the said sectioned tread chain being removed.

In Fig. 2, I have shown other gears whereby the sleeve 53, and hence the worm 52, and consequently, the rear axle 48 can be driven either forwardly or rearwardly and at variable speeds, but such mechanism is well known and it is not necessary for the purposes of this case to further consider the same. Means has now been described for driving the rear axle 48 from the engine 17.

To the outer ends of the sections of the divided rear axle 48 are secured large and heavy sprocket-like wheels 56 formed with incut notches 57 to receive the chain rollers 31, and provided with peripherally spaced rollers 58, to engage against the knuckle blocks 35 of the tread chain (see Figs. 1 and 2).

The two tread chains described, as already indicated, run, one over each of the tread sprocket-like wheels 56 and extend forwardly therefrom with their bearing rollers or wheels 42 inward in position to engage with the roller runways which will now be described.

These two runways are alike and may be described separately. The rear portion of the chain runway is in the form of a bifurcated U-shaped channel 59, both prongs of which are integral with, or otherwise, rigidly secured to a short pedestal bracket 60 which, in turn, is rigidly secured to the platform and cross beam 12 of the tractor frame. The outside portion of the platform or plate 15 forms a horizontal forward extension of the channel of the lower run of the U-shaped channel or yoke 59 and the rollers 42 of the links that are engaged with the ground will directly engage with the undersurface or portion of said platform or bearing plate.

Figure 3:
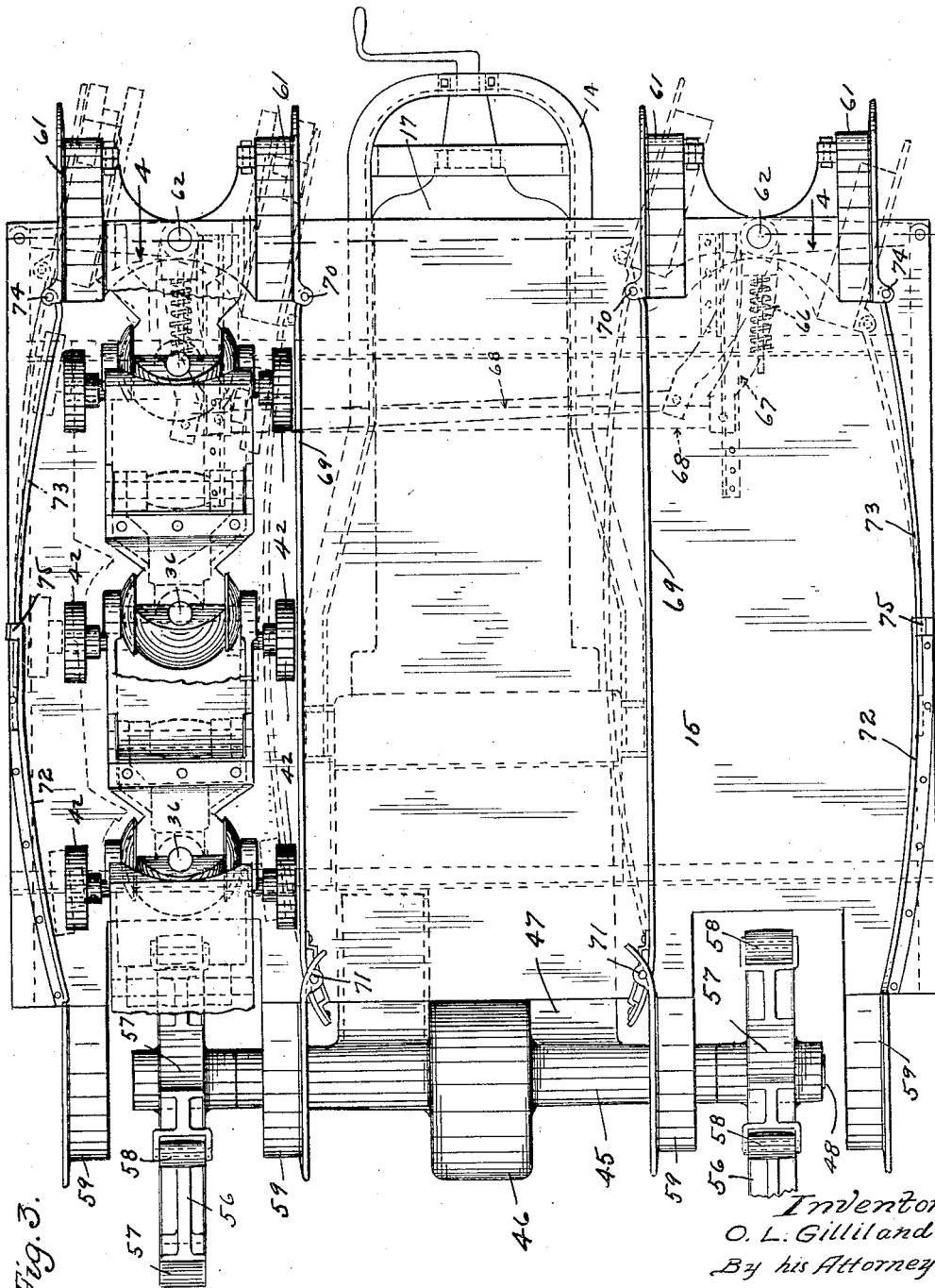
Fig. 3 is a bottom view of the tractor, one of the tread chains being entirely removed and the other tread chain being removed in part only.
Figure 4:
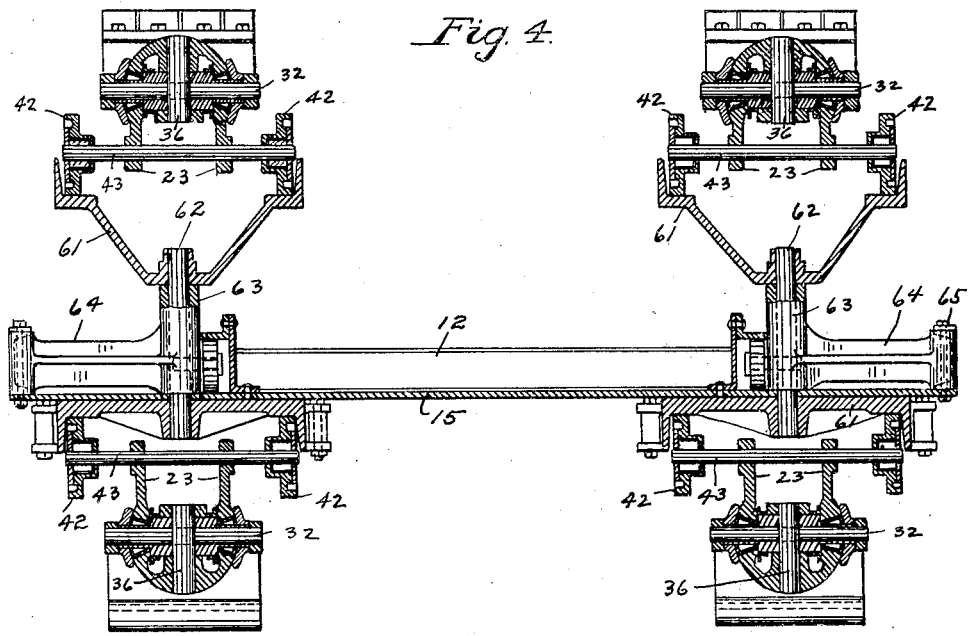
Fig. 4 is a transverse vertical section taken approximately on the line 4—4 of Fig. 3.
Figure 5:
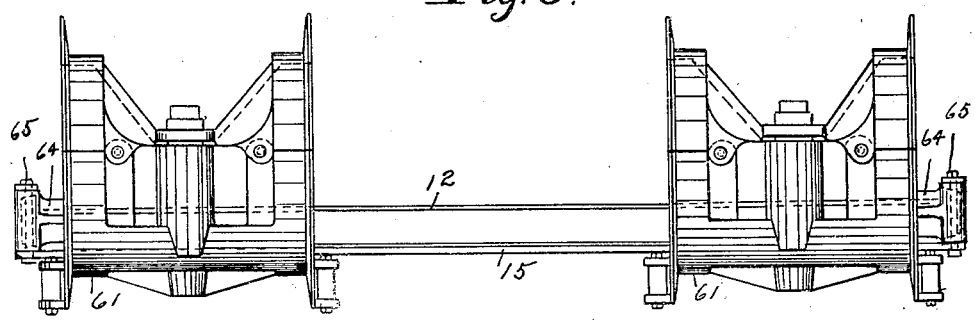
Fig. 5 is a front elevation showing the roller runways and certain connected parts.
Figure 6:
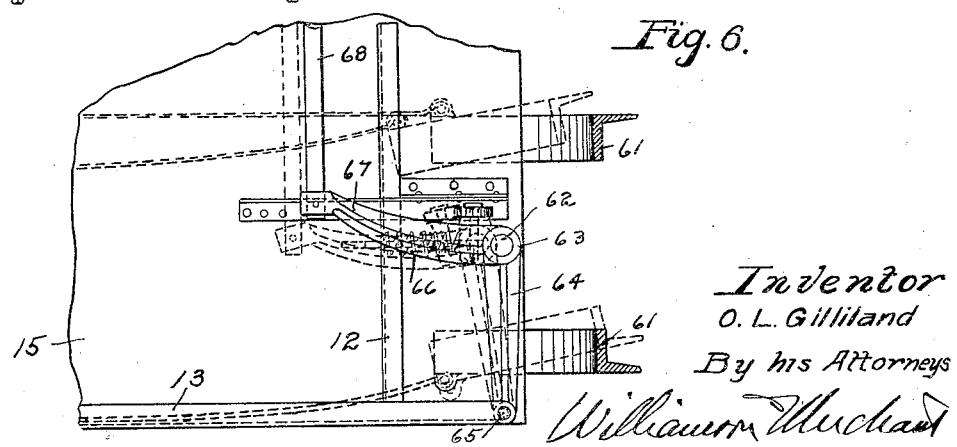
Fig. 6 is a fragmentary horizontal section taken approximately on the line 6—6 of Fig. 1, the tread chain being removed.

The front portions of the two chain runways are afforded by bifurcated U-shaped or yoke-like channels 61 that align with the rear fixed yokes 59. The lower portions of the said two yokes 59 and 61 will guide the rollers 42 against the undersurface of the deck or platform 15. The yokes 61, by vertical pivot pins 62, are pivoted to sleeves 63 on the inner ends of horizontal arms 64 the outer ends of which arms are pivoted to the platform or deck 15 or other fixed adjacent frame structure at 65. Springs 66 re-act against the front cross bar 12 and yieldingly press the sleeves 63 forward so that the pivot pins 62 will normally stand, as shown in Fig. 3. The yokes 61 are provided with rigidly attached rearwardly extended arms 67 that are cross connected by a link 68, operated, as hereinafter described.

Each of the two chain runways above described, on the underside of the deck or platform 15, is provided with inside and outside so-called guard rails. The inside guard rails 69 (see particularly Figs. 3 and 12) are flat flexible bars pivotally connected at their front ends at 70 to the lower inside portions of the respective yoke 61. The rear ends of the said inside rails 69 are connected to the lower inside prongs of the rear yokes 59, by sliding pivotal connections shown at 71.

The outside guard rails comprise curved fixed sections 72 and curved movable sections 73. The sections 73 are pivotally connected at 74 to the lower outside portions of the yoke 61 and will have a slidable connection with the ends of the sections 72 at 75.

The steering of the tractor is accomplished by giving oscillatory movements to the front yokes 61 and by bending or deflecting the guard rails 69, and this is accomplished as follows, attention being directed now, particularly, to Figs. 1, 12, 13 and 14. The numeral 76 indicates a wheel-equipped steering post shaft mounted in suitable bearings on the fixed part of the truck frame or on the deck 15 and provided at its lower end with a beveled pinion 77 that meshes with an upper gear segment 78 and a lower gear segment 79. These two gear segments, as shown, are pivoted to a bearing 80 on the deck 15. The gear segment 78 is provided with an arm 81, is connected by a short link 82 to the intermediate portion of the cross tie link 68.

The lower gear segment 79 is provided with two diverging arms 83 and 84 that are connected by links 85 and 86, respectively, to thrust collars 87 and 88. The thrust collars 87 and 88 are slidably mounted, respectively, on thrust tubes 89 and 90, the latter of which works telescopically within the former, said two tubes, at their outer ends, being rigidly connected, one to each of the inside guard rails 69. Collars 91 and 92 are rigidly secured on the tube 89 and collars 93 and 94 are rigidly secured on the tube 90. A coiled spring 95 is interposed between collars 87 and 91 and a similar coiled spring 96 is interposed between the collars 88 and 93.

The operation of the steering device just described, is substantially as follows:

When it is desired, for example, to cause the machine to turn toward the right, the steering post shaft 76 will be oscillated in a direction to cause the upper gear segment 78 and its arm 81 to move toward the left and the gear segment 79 to move toward the right, but cause the arms 83 and 84 of said lower gear segment to move toward the left. The above noted movement of the upper gear segment causes the pivoted front yokes 61 to turn their forward portions toward the right but the movements of the arms 83 and 84 toward the left causes the two thrust tubes 89 and 90 to move toward the left, thereby bending both of the inner guard rails 69 toward the left. In Fig. 12, however, the flexible guard rails 69 are shown straight, this being the condition when the tractor is running straight ahead. Attention is further called to the fact that in view of the arrangement of the arms 83 and 84, movement thereof, in either direction from the position shown in Fig. 12 will always cause the guard rail 69, that is on the inside of the curve, to be given greater deflection than the rail that is on the outer side of the curve, and this is true, regardless, of which direction the tractor is turned as the one of the arms 83 or 84 which moves the inside flange moves toward a line normal to the sleeve 89 and thus has a greater movement along the line of said sleeve than the other arm.

As best shown in Figs. 1 and 2, laterally spaced pairs of upper wheel or roller guiding rails 97 are pivotally connected at 98 to the upper prongs of the respective yokes 61, and the rail ends of these upper rails 97 have slidable connection to the upper prong of the rear yoke 59, so that the said rails 97 will guide the chain rollers or wheels 42 on their upward line of travel from the rear yokes to the front yokes.

The tractor illustrated is designed especially as a quite small tractor, and hence, the main chain roller guiding surfaces afforded by the deck or platform 15 are rigid, the one in respect to the other; but for large tractors there would preferably be a flexible connection between these two main guiding elements, so that the two chains will independently adapt themselves to irregularities in the road or ground.

In respect to the construction of the tread chains, it will be noted that they are flexible in a vertical plane and also in horizontal planes, so that they are free to travel around the driving sprockets to the front and rear yokes and to adapt themselves to the lateral curvature of the lower chain guides for steering purposes.

Nevertheless, the said chains are rigid against twisting movements, that is, the one link cannot rotate or turn on an axis that is longitudinally of the chain. In the lower portions of the tread chains, the load strain is evenly distributed between those links that are on the ground. When the front yokes 61 are set at an angle for turning, the tread chain links that are in contact therewith will, of course, be positively moved into angular positions, and the links, as they are brought into contact with the ground, will be set at the proper angle on the curve that is to be traveled, so that, in a sense, the links will be laid onto the ground in the form of a curved track.

By reference, particularly, to Figs. 1 and 8, it will be noted that the links of the tread chains between the traction lugs 22 are raised so as to form pockets. This causes the greatest part of the weight to be thrown directly on the traction lugs, but as the traction lugs set into soft ground, the earth will form into the pockets between the traction lugs, forming a series of ridges which very greatly increases the traction quality of the tread chains. In fact, this chain will have more than twice the traction quality of a tread chain that has flat links with ordinary lugs thereon.

By reference, particularly to Fig. 1, it will be noted that the links of the tread chains immediately before they contact with the ground, are turned downward in pairs or two at a time with the two links nearly in alignment and that the final movement thereof into contact with the ground and that they are brought quickly to a position quite close to the ground and at but slight angle to the ground and that thereafter, they are slowly moved into contact with the ground, very much as if, during this final movement, they were traveling on an arc of a very large circle. The tread chains will, of course, sink considerably in soft ground and the machine must climb slightly on the tread chains that are laid upon the ground, but the above manner of bringing the tread chains onto the ground reduces to a minimum the force lost in thus climbing to compensate for sinkage of the tread chains into the ground. Thus, very great saving of power is accomplished.

What I claim is:

1. In a tractor, the combination with trough shaped chain runways capable of horizontal angular movement, of tread chains movable on said chain runways and having links connected by vertical and horizontal pivot pins, so that they will travel an endless varying course and may be laid on the ground, either on straight or curved lines, the former for straight ahead travel and the latter for traveling a curve said runways being fixed relatively to said frame except for said horizontal angular movement.

2. In a tractor the combination with a frame and trough shaped chain runways capable of horizontal angular movement, of tread chains movable on said chain runways and having links connected by vertical and horizontal pivot pins, so that they will travel an endless varying course and may be laid on the ground, either on straight or curved lines, the former for straight-ahead travel and the latter for traveling a curve, certain of said chain links having rollers directly engageable with said runways, said runways being fixed relatively to the said frame except for said horizontal and angular movement.

3. In a tractor, the combination with trough-shaped chain guideways capable of horizontal angular adjustment, of tread chains movable on said chain runways and having links capable of vertical and horizontal pivotal movements, so that they will travel an endless varying course and may be laid on the ground, either on straight or curved lines, the former for straight-ahead travel and the latter for traveling a curve, the links of said chains having traction lugs that will engage the ground at longitudinally spaced points along the line of travel, and the said chains having rollers for engagement with said chain runways, said rollers being so positioned that they will be approximately over underlying traction lugs when the latter are engaged with the ground.

4. A tractor having in combination alined pairs of front and rear U-shaped runways adapted to receive an endless chain, said front runway being swingable laterally, inner and outer guide rails connecting the sides of said alined guide rails, said inner rails being flexible, pivoted to the front runways and slidably connected to the rear runways, said outer runways each having a fixed longitudinal section and a flexible movable section pivoted to said front runways, and slidably engaging said fixed section.

5. A tractor having in combination laterally spaced trough-shaped runways, adapted to receive an endless tread chain, each including fixed rear guide yokes, laterally swingable front guide yokes, and intermediate flexible and slidable inner and outer guide rails connecting the lower sides of said alined yokes.

6. In a tractor, the combination with laterally spaced endless tread chain runways including fixed rear guide yokes and laterally pivoted front guide yokes, a steering device with connections for oscillating said front guide yokes, and tread chains having rollers arranged to run in the respective guideways, the links of said tread chains being connected by horizontal and vertical pivots, the said chain runways each having flexible guard rails, and connections between said flexible guard rails and said steering device for bending said flexible guard rails simultaneously in the same direction.

7. In a tractor, the combination with laterally spaced endless tread chain runways including fixed rear guide yokes and laterally pivoted front guide yokes, a steering device with connections for oscillating said front guide yokes, and tread chains having rollers arranged to run in the respective guideways, the links of said tread chains being connected by horizontal and vertical pivots, the said chain runways having flexible guard rails, and connections between said flexible guard rails and said steering device for bending said flexible guard rails simultaneously in the same direction, the said connections serving to give the greatest curvature to the guard rail that is on the inner side of the curve.

8. A tractor having in combination, a flanged trough-shaped endless guideway for a chain comprising a fixed rear portion, a laterally swingable front portion, upper guard rails pivoted to the front portion at each side thereof, and lower flexible guard rails pivoted to the front portions at each side thereof.

9. A tractor having in combination a flanged trough-shaped guideway comprising a laterally swingable front portion, flexible intermediate side portions alined with the sides of said front portion and steering mechanism for swinging said front portion and simultaneously flexing said intermediate portions.

10. A tractor having in combination an endless runway for an endless chain comprising fixed rear and movable front U-shaped sections having lateral flanges thereon, rigid top intermediate side rails alined with the flanges of the front and rear portions, and bottom flexible side rails alined with the flanges of the front and rear portions.

11. The structure set forth in claim 10, said top intermediate side rails, and said bottom intermediate side rails being pivotally connected to the rear ends of the flanges of said front U-shaped sections.

12. A tractor having in combination a trough-shaped runway adapted to receive an endless tread chain and comprising laterally swingable front and fixed rear U-shaped sections, and longitudinal extensible guard rails alined with the sides of and extending between said sections and movable with said front sections.

13. A tractor having in combination laterally spaced endless tread chain runways, each including fixed rear guide yokes, laterally pivoted front guide yokes, and flexible guard rails extending between said yokes, a steering device for oscillating said front guide yokes, and connections between said steering device and said flexible guard rails for simultaneously bending said rails, said connections being arranged to bend one of said rails more than the other.

14. A tractor having in combination a chain runway including fixed rear guide yokes, laterally movable front guide yokes, and guard rails, said guard rails being pivoted to the rear end of said front guide yokes, and being longitudinally movable at their other ends relatively to said fixed guide yokes.

15. A tractor having in combination, a tread chain runway including a plate and spaced flexible guard rails forming a trough, and means connected to one end of said rails for simultaneously bending the same laterally.

16. A tractor having in combination an endless chain runway comprising a laterally swingable trough-shaped member, spaced flexible guard rails alined with the sides of said member and pivotally connected to the rear thereof, and a steering means for swinging said member and simultaneously bending said guard rails laterally.

17. A tractor having in combination, a pair of tread chain runways each having a flexible guard rail forming the inner side thereof, means for simultaneously bending said rails laterally when the tractor is turned, said means acting to bend the rail on the inside of the curve a greater amount than the rail on the outside of the curve.

In testimony whereof I affix my signature.

ORRA L. GILLILAND.